(12) United States Patent
Choi et al.

(10) Patent No.: US 11,035,297 B2
(45) Date of Patent: Jun. 15, 2021

(54) CONTROL APPARATUS AND METHOD OF GAS TURBINE SYSTEM

(71) Applicant: DOOSAN HEAVY INDUSTRIES & CONSTRUCTION CO., LTD., Changwon-si (KR)

(72) Inventors: Byung Hee Choi, Yongin-si (KR); Seong Jin Hong, Daejeon (KR)

(*) Notice: Subject to any disclaimer, the term of this patent is extended or adjusted under 35 U.S.C. 154(b) by 478 days.

(21) Appl. No.: 15/939,277

(22) Filed: Mar. 29, 2018

(65) Prior Publication Data
US 2018/0306122 A1    Oct. 25, 2018

(30) Foreign Application Priority Data
Apr. 24, 2017   (KR) .................. 10-2017-0052388

(51) Int. Cl.
*F02C 9/18*    (2006.01)
*F02C 3/06*    (2006.01)
(Continued)

(52) U.S. Cl.
CPC .............. *F02C 9/18* (2013.01); *F02C 3/06* (2013.01); *F02C 9/20* (2013.01); *F02C 6/08* (2013.01);
(Continued)

(58) Field of Classification Search
None
See application file for complete search history.

(56) References Cited

U.S. PATENT DOCUMENTS

| 4,767,259 A | * | 8/1988 | Kurosawa | ............... F01P 7/026 |
| | | | | 415/17 |
| 6,615,574 B1 | * | 9/2003 | Marks | ....................... F02C 7/18 |
| | | | | 60/772 |

(Continued)

FOREIGN PATENT DOCUMENTS

| JP | 2003206749 A | 7/2003 |
| JP | 2007535631 A | 12/2007 |

(Continued)

OTHER PUBLICATIONS

European Search Report dated Sep. 25, 2018 in connection with European Patent Application No. 18166267.7 which corresponds to the above-referenced U.S. application.

(Continued)

*Primary Examiner* — Gerald L Sung
*Assistant Examiner* — Marc J Amar (57) ABSTRACT

In a gas turbine system which includes a compressor for sucking and compressing air and an air supplying means for supplying the compressed air from the compressor to a combustor and a turbine and which drives a power generator through rotation of the turbine, a control apparatus includes a sensing unit and a compressed air control unit. The sensing unit measures a turbine inlet temperature indicating a temperature of combustion gas introduced into the turbine and measures an exhaust gas temperature indicating a temperature of exhaust gas discharged from the turbine. The compressed air control unit control the air supplying means to adjust the amount of compressed air supplied to the turbine, based on the measured turbine inlet temperature and the measured exhaust gas temperature. The control apparatus allows the combustor to completely combust fuel even in a low load state, thereby reducing the amount of harmful exhaust gas discharged to the atmosphere.

4 Claims, 6 Drawing Sheets

(51) Int. Cl.
*F02C 9/20* (2006.01)
*F02C 7/18* (2006.01)
*F02C 6/08* (2006.01)

(52) U.S. Cl.
CPC ............ *F02C 7/18* (2013.01); *F05D 2220/32* (2013.01); *F05D 2270/08* (2013.01); *F05D 2270/303* (2013.01); *F05D 2270/304* (2013.01); *F05D 2270/306* (2013.01); *F05D 2270/3032* (2013.01)

(56) References Cited

U.S. PATENT DOCUMENTS

| | | | | |
|---|---|---|---|---|
| 6,779,346 | B2* | 8/2004 | Nichols | F02C 9/52 60/782 |
| 7,549,292 | B2* | 6/2009 | Peck | F02C 9/18 60/773 |
| 8,490,404 | B1* | 7/2013 | Adibhatla | F02C 9/00 60/772 |
| 2006/0005526 | A1* | 1/2006 | Tanaka | F02C 9/00 60/39.27 |
| 2007/0031238 | A1 | 2/2007 | Fujii et al. | |
| 2010/0215480 | A1* | 8/2010 | Leach | F02C 9/18 415/145 |
| 2010/0286889 | A1* | 11/2010 | Childers | F02C 6/08 701/100 |
| 2011/0037276 | A1* | 2/2011 | Hoffmann | F02C 9/28 290/40 C |
| 2013/0067928 | A1* | 3/2013 | Arias Chao | F02C 7/185 60/782 |
| 2014/0123666 | A1* | 5/2014 | Ekanayake | F02C 3/305 60/775 |
| 2014/0126991 | A1* | 5/2014 | Ekanayake | F01D 25/12 415/1 |
| 2014/0157791 | A1* | 6/2014 | Saha | F01D 25/12 60/785 |
| 2014/0210984 | A1* | 7/2014 | Warwick | F02C 7/28 348/81 |
| 2015/0059355 | A1* | 3/2015 | Feigl | F02C 9/18 60/782 |
| 2017/0234224 | A1* | 8/2017 | Adibhatla | F02C 9/18 60/226.1 |
| 2018/0283288 | A1* | 10/2018 | Ishii | F02C 9/00 |

FOREIGN PATENT DOCUMENTS

| | | |
|---|---|---|
| JP | 2008-075578 A | 4/2008 |
| JP | 2009062981 A | 3/2009 |
| JP | 2016014371 A | 1/2016 |

OTHER PUBLICATIONS

Japanese Office Action dated Apr. 2, 2019 in connection with Japanese Patent Application No. 2018-043584 which corresponds to the above-referenced U.S. application.

\* cited by examiner

CONTROL APPARATUS AND METHOD OF GAS TURBINE SYSTEM

CROSS-REFERENCE TO RELATED APPLICATIONS

This application claims priority to Korean Patent Application No. 10-2017-0052388, filed on Apr. 24, 2017, the disclosure of which is incorporated herein by reference in its entirety.

BACKGROUND OF THE INVENTION

Field of the Invention

Exemplary embodiments of the present invention relate to a control apparatus and method of a gas turbine system, and more particularly, to a control apparatus and method of a gas turbine system, which is capable of reducing harmful gas discharged from a gas turbine.

Description of the Related Art

In general, an engine or apparatus having a turbine such as a gas turbine or steam turbine is a power generator for converting thermal energy of gas or fluid into a rotational force as mechanical energy, and includes a rotor axially rotated by gas or fluid and a stator supporting and surrounding the rotor.

A gas turbine used in a power station to produce electricity typically includes a compressor for supplying high-pressure air to a combustor, which generates combustion gas, and a turbine driven by the combustion gas discharged from the combustor. The compressor of the gas turbine is generally coupled to a shaft of the turbine to be axially rotated together with the turbine. While being axially rotated, the compressor sucks and compresses external air. The compressed air from the compressor is supplied to the combustor. The combustor combusts the compressed air by introducing fuel to the compressed air, generates high-temperature, high-pressure combustion gas through the combustion, and supplies the thus generated combustion gas to the turbine. The high-temperature, high-pressure combustion gas supplied to the turbine drives rotor blades of the turbine, thereby rotating the rotor of the turbine.

The gas turbine having the above-described structure is configured to supply part of the compressed air to the turbine and to supply the remainder of the compressed air to the combustor. The air compressed by the compressor serves to cool the turbine.

The gas turbine is generally controlled to maintain the temperature of the turbine inlet at the optimal temperature, in order to minimize exhaust gas while maximizing the efficiency. However, when the load decreases, the gas turbine may have difficulties in constantly maintaining the temperature of the turbine inlet, and the temperature of the turbine inlet inevitably drops. The drop of the turbine inlet temperature increases harmful exhaust gas. Therefore, there is a demand for a control system which can constantly maintain the turbine inlet temperature to prevent an increase of harmful exhaust gas, even when the load is low.

SUMMARY OF THE INVENTION

The present invention has been made in view of the above problems, and it is an object of the present invention to provide a control apparatus and method of a gas turbine system, which can constantly maintain a turbine inlet temperature at the optimal temperature even when a load is low.

It is another object of the present invention to provide a control apparatus and method of a gas turbine system, which is capable of minimizing the discharge of harmful gas from a gas turbine, regardless of load conditions.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a control apparatus of a gas turbine system which includes a compressor for sucking and compressing air and an air supplying means for supplying the compressed air from the compressor to a combustor and a turbine and which drives a power generator through rotation of the turbine. The control apparatus may include a sensing unit configured to measure a turbine inlet temperature indicating a temperature of combustion gas introduced into the turbine and to measure an exhaust gas temperature indicating a temperature of exhaust gas discharged from the turbine; and a compressed air control unit configured to control the air supplying means to adjust the amount of compressed air supplied to the turbine, based on the measured turbine inlet temperature and the measured exhaust gas temperature.

The compressed air control unit may be further configured to increase the amount of compressed air supplied to the turbine when the exhaust gas temperature rises.

The compressed air control unit may be further configured to supply a first amount of compressed air when the exhaust gas temperature is less than a preset threshold value, and to control the air supplying means to additionally supply a second amount of compressed air when the exhaust gas temperature reaches a preset threshold value and the turbine inlet temperature is less than or equal to a preset maximum value. The second amount may be set, by the compressed air control unit, in proportion to {(the first amount)×(the preset maximum value of the turbine inlet temperature−the measured turbine inlet temperature)/(the preset maximum value of the turbine inlet temperature)}.

In the gas turbine system, the combustor produces high-temperature, high-pressure combustion gas by combusting the compressed air and fuel, and the turbine is rotated by the combustion gas produced through the combustor. The turbine inlet temperature may be measured when the combustion gas produced by the combustor is introduced to the turbine. On the other hand, conditions may exist where the combustion gas produced by the combustor and introduced to the turbine cannot be measured.

In accordance with another aspect of the present invention, there is provided the control apparatus of the above gas turbine system may include a sensing unit configured to measure a revolutions-per-minute (RPM) value of a rotor installed in the turbine and to measure an exhaust gas temperature indicating a temperature of exhaust gas discharged from the turbine; and a compressed air control unit configured to control the air supplying means to adjust the amount of compressed air supplied to the turbine, based on the measured RPM value of the rotor installed in the turbine and the measured exhaust gas temperature.

The compressed air control unit may be further configured to supply a first amount of compressed air, when the exhaust gas temperature is less than a preset threshold value, and to control the air supplying means to additionally supply a third amount of compressed air, when the exhaust gas temperature reaches the preset threshold value and the RPM value of the rotor is less than or equal to an inflection point RPM value. The inflection point RPM value may indicate the RPM value of the rotor when the exhaust gas temperature starts to change from the preset threshold value to a value lower than the preset threshold value. The third amount may be set, by the compressed air control unit, in proportion to {(the first amount)×(the inflection point RPM−the measured RPM)/(the inflection point RPM)}.

In accordance with another aspect of the present invention, there is provided a control method of the above gas turbine system, which may include steps of measuring a turbine inlet temperature indicating a temperature of combustion gas introduced into the turbine; measuring an exhaust gas temperature indicating a temperature of exhaust gas discharged from the turbine; and controlling the air supplying means to adjust the amount of compressed air supplied to the turbine, based on the measured turbine inlet temperature and the measured exhaust gas temperature.

The controlling of the above control method may include a step of increasing the amount of compressed air supplied to the turbine when the exhaust gas temperature rises or supplying a first amount of compressed air when the exhaust gas temperature is less than a preset threshold value.

The control method may further include a step of controlling the air supplying means to additionally supply a second amount of compressed air when the exhaust gas temperature reaches a preset threshold value and the turbine inlet temperature is less than or equal to a preset maximum value.

In accordance with another aspect of the present invention, there is provided a control method of the above gas turbine system, which may include steps of measuring an RPM value of a rotor installed in the turbine; measuring an exhaust gas temperature indicating a temperature of exhaust gas discharged from the turbine; and controlling the air supplying means to adjust the amount of compressed air supplied to the turbine, based on the measured RPM value and the measured exhaust gas temperature.

The controlling of the above control method may include a step of supplying a first amount of compressed air when the exhaust gas temperature is less than a preset threshold value.

The control method may further include a step of controlling the air supplying means to additionally supply a third amount of compressed air when the exhaust gas temperature reaches the preset threshold value and the RPM value of the rotor is less than or equal to an inflection point RPM value. The inflection point RPM value may indicate the RPM value of the rotor when the exhaust gas temperature starts to change from the preset threshold value to a value lower than the preset threshold value, and the third amount maybe set in proportion to {(the first amount)×(the inflection point RPM−the measured RPM)/the inflection point RPM)}.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

In order to clearly describe the present invention, elements irrelevant to the descriptions will be omitted. Throughout the specification, the same or like components are represented by the same reference numerals.

In this specification, when an element is referred to as being "connected" to another element, it may not only indicate that the former element is "directly connected" to the latter element, but also indicate that the former element is "electrically connected" to the latter element with another element interposed therebetween. Moreover, when an element is referred to as "including" a component, it may indicate that the element does not exclude another component but can further include another component, unless referred to the contrary.

The terms such as first, second and third are used to describe various parts, components, regions, layers and/or sections, but are not limited thereto. Those terms are only used to distinguish a part, component, region, layer or section from another part, component, region, layer or section. Therefore, a first part, component, region, layer or section in the following descriptions may be referred to as a second part, component, region, layer or section without departing the scope of the present invention.

The technical terms used in this specification are only used to describe a specific embodiment, but not intended to limit the present invention. The terms of a singular form used herein may include plural forms unless referred to the contrary. The meaning of the term "including" used in this specification specifies a characteristic, region, integer, step, operation, element and/or component, and does not exclude the presence or addition of another characteristic, region, integer, step, operation, element and/or component.

Although not defined differently, all terms including the technical terms and scientific terms used herein have the same meanings as those understood by a person skilled in the art to which the present invention pertains. The terms defined in a generally used dictionary may be additionally analyzed as meanings which coincide with the related technical documents and the contents disclosed in this specification, and not analyzed as ideal or formal meanings unless they are not defined.

Figure 1:
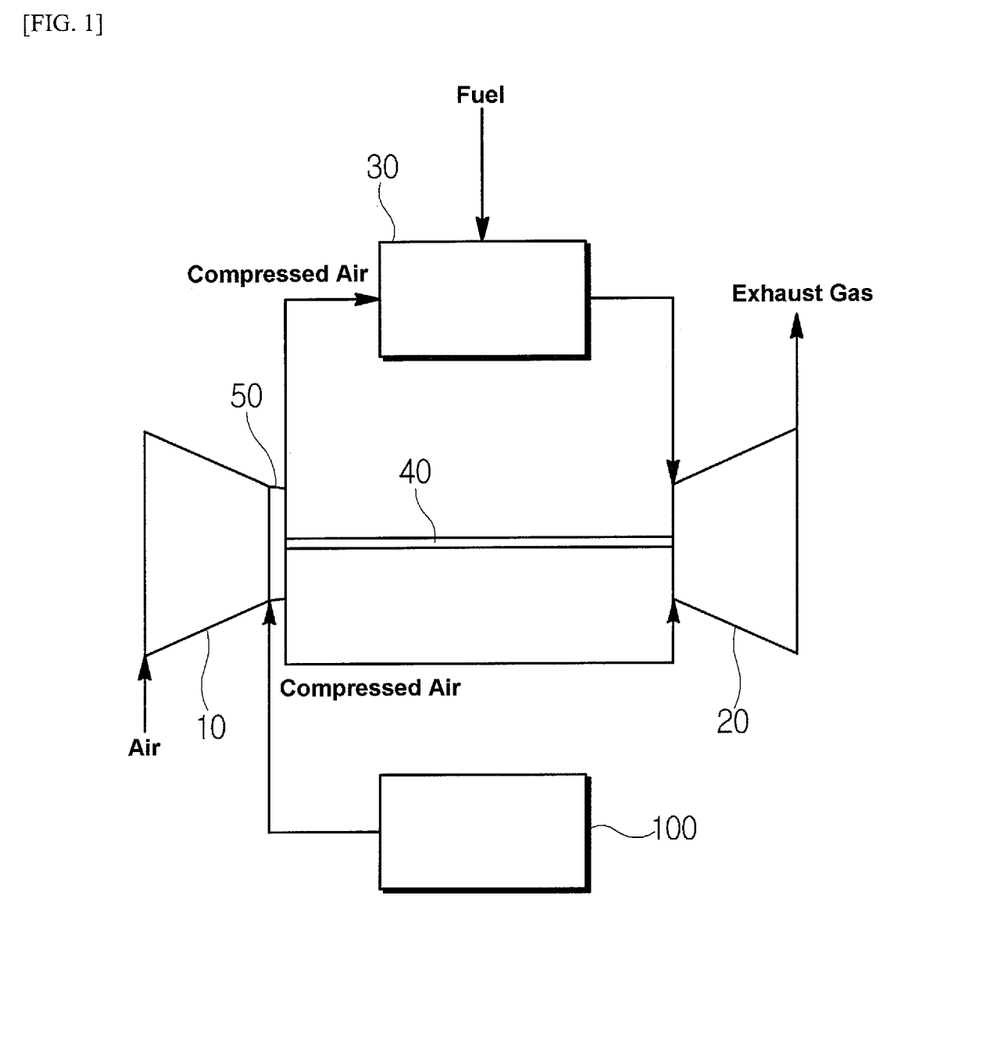
FIG. 1 is a diagram illustrating a gas turbine system according to an embodiment of the present invention.

FIG. 1 illustrates a gas turbine system according to an embodiment of the present invention.

Referring to FIG. 1, the gas turbine system may include a compressor 10, a turbine 20, a combustor 30, a shaft 40, an air supplying means 50, and a control apparatus 100.

The compressor 10 may perform a function of generating high-pressure air by sucking and compressing external air. The compressed air may be directed to the combustor 30 by the air supplying means 50, and a portion of the compressed air may be passed to the turbine 20 and used to cool the turbine 20. At this time, the compressed air passed to the turbine 20 may be cooled through a cooler (not illustrated), and the cooled, compressed air may be delivered to the turbine 20.

The combustor 30 may combust the compressed air from the compressor 10 by injecting fuel into the compressed air, and through the combustion, generate high-pressure, high-temperature combustion gas which is provided to the turbine 20. The high-pressure, high-temperature combustion gas supplied to the turbine 20 drives rotor blades of the turbine, thereby rotating the rotor of the turbine 20. The temperature and pressure of the combustion gas supplied to the turbine 20 are lowered while driving the rotor blades of the turbine. Finally, the combustion gas is discharged as exhaust gas to the atmosphere.

The turbine 20 and the compressor 10 may be fixed together to the (one) shaft 40. Therefore, with the rotor of the turbine 20 rotated as described above, the compressor 10 is also rotated.

The control apparatus 100 may perform various controls to efficiently drive the gas turbine system. The present invention relates to a method for controlling the air supplying means 50 in order to adjust the amount of compressed air supplied to the turbine 20.

The gas turbine system may generate power by rotating the rotor of the turbine 20 through fuel combustion. At this time, harmful exhaust gas is produced. To minimize the production of harmful exhaust gas, the gas turbine system needs to completely combust the injected fuel. That is, the temperature of the combustion gas produced by the combustor 30 and introduced to the turbine 20 at its inlet, or the turbine inlet temperature, should be constantly maximized in order to minimize the production of harmful exhaust gas. Here, a maximum permissible turbine inlet temperature is established according to specifications of the turbine and the combustor. The output of the gas turbine system may be directly controlled through a fuel valve (not shown) for controlling the amount of fuel injected into the combustor 30.

That is, the control apparatus 100 may perform control based on the turbine inlet temperature of the combustion gas and the exhaust gas temperature, such that the gas turbine system can be efficiently operated. Both of these gas temperatures tend to vary depending on a fluctuating load of the gas turbine system.

Figure 2:
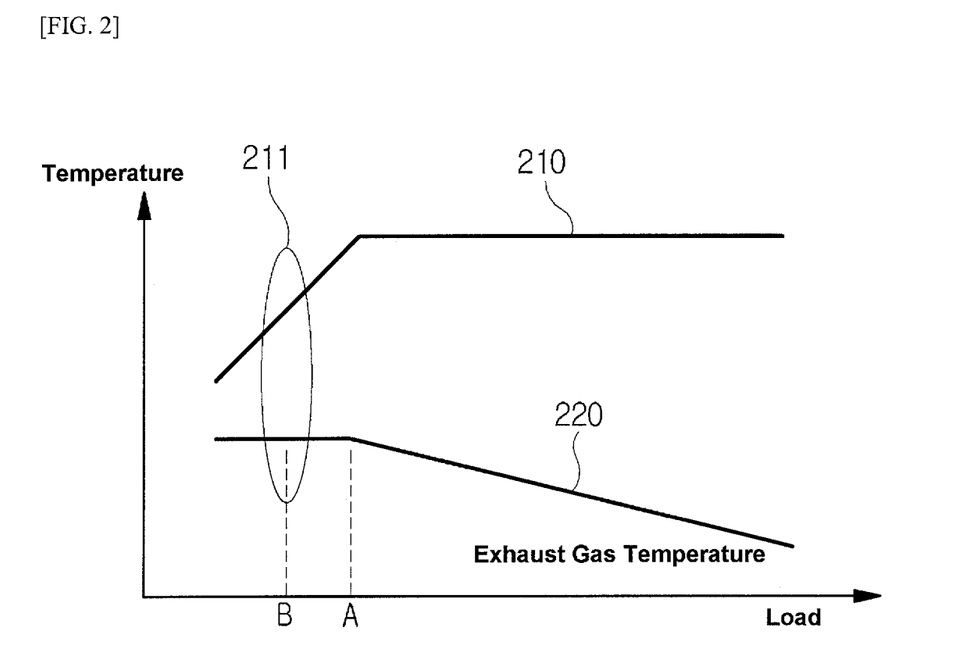
FIG. 2 is a graphical representation of the relation between a turbine inlet temperature and exhaust gas temperature, depending on a load.

FIG. 2 illustrates the relation between the turbine inlet temperature and the exhaust gas temperature, depending on a load.

In a general situation, the gas turbine system tries to constantly maintain the turbine inlet temperature at as high a temperature as possible, in order to acquire the optimal efficiency while minimizing the amount of harmful exhaust gas. The upper limit of the turbine inlet temperature may be determined by the durability of the turbine and the combustor with respect to temperature. That is, the turbine inlet temperature may be set to a maximum value at which the components of the turbine and/or the combustor will not be adversely affected, and the control apparatus 100 may decide and control the amounts of compressed air and fuel supplied to the combustor, such that the turbine inlet temperature can be maintained at the preset maximum value.

FIG. 2 shows that, as the load increases, an exhaust gas temperature 220 drops while a turbine inlet temperature 210 is constantly maintained. Conversely, as the load decreases, the exhaust gas temperature 220 rises while the turbine inlet temperature 210 is constantly maintained. This is because, as the load decreases, the rotational speed of the rotor is lowered to reduce thermal energy consumption, where rotational speed may be expressed in rotor's revolutions per minute or RPM. Thus, an RPM value of the rotor would be lowered to lower the rotational speed and thus reduce thermal energy consumption. That is, since a decrease of the load reduces thermal energy consumed by the combustion gas introduced into the turbine 20 at the same temperature, the exhaust gas temperature 220 rises.

Meanwhile, environmental regulations proscribe excessively high temperatures in exhaust gas. In other words, when the exhaust gas temperature 220 rises over a threshold value, the amount of harmful exhaust gas may exceed a controllable range, whereupon an excessive amount of harmful exhaust gas (i.e., an amount beyond the regulation range) may be discharged. In FIG. 2, the plateau in the plot of the exhaust gas temperature 220 occurs at the threshold value.

Therefore, the control apparatus 100 may lower the turbine inlet temperature 210 of the combustion gas such that the exhaust gas temperature 220 does not rise over the threshold value. That is, when the load is lower than the maximum production level, the control apparatus 100 may lower the turbine inlet temperature 210 such that the exhaust gas temperature 220 does not rise over the threshold value. The state in which the load is lower than the maximum production level may be referred to as a partial load state 211. However, when the turbine inlet temperature 210 is lowered, the efficiency of the gas turbine system may be reduced. In this case, since the fuel is incompletely combusted, more harmful substances may be contained in the exhaust gas. In order to prevent such a situation, the control apparatus 100 needs to lower the exhaust gas temperature 220 while controlling the turbine inlet temperature 210 to continuously maintain the maximum value.

Figure 3:
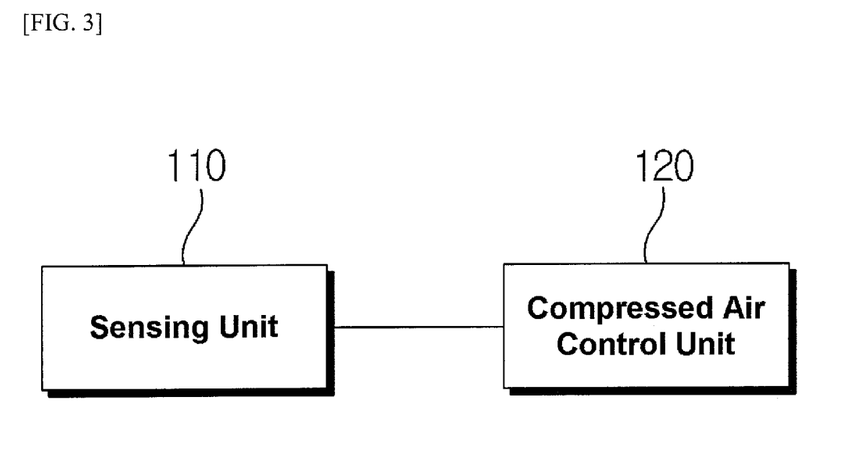
FIG. 3 is a block diagram illustrating the structure of the control apparatus of FIG. 1 according to an exemplary embodiment of the present invention.

FIG. 3 illustrates the structure of the control apparatus 100 according to the embodiment of the present invention.

Referring to FIGS. 1 to 3, the control apparatus 100 may include a sensing unit 110 and a compressed air control unit 120. The sensing unit 110 may measure the turbine inlet temperature 210 and the exhaust gas temperature 220. The sensing unit 110 may measure the rotational speed (RPM value) of the rotor installed in the turbine 20, and estimate a load based on the measured RPM value.

The compressed air control unit 120 may control the amount of compressed air respectively transferred to the combustor 30 and the turbine 20, based on the exhaust gas temperature 220 in combination with one of the load (RPM value) and the turbine inlet temperature 210, which are all measured by the sensing unit 110. When the exhaust gas temperature 220 rises while the load decreases, the compressed air control unit 120 may control the amount of compressed air introduced into the combustor 30, such that the turbine inlet temperature 210 can be continuously maintained at the maximum value. In addition, when the exhaust gas temperature 220 continues to rises and reaches the threshold value, the compressed air control unit 120 may control the air supplying means 50 to increase the amount of compressed air supplied to the turbine 20, in order to cool the turbine 20. Therefore, the combustion gas introduced into the turbine 20 may be further cooled to thereby lower the exhaust gas temperature 220. At this time, the compressed air control unit 120 may determine whether to increase the amount of compressed air, based on the currently measured turbine inlet temperature 210. In an embodiment, the compressed air control unit 120 may increase the amount of compressed air in proportion to a ratio calculated as (maximum value of turbine inlet temperature−current turbine inlet temperature)/(maximum value of turbine inlet temperature). Verbally, the ratio may be expressed as the difference between the maximum value of the turbine inlet temperature and the current turbine inlet temperature over the maximum value of the turbine inlet temperature.

As described above, the control apparatus may further lower the exhaust gas temperature by increasing the amount of compressed air supplied to the turbine. Thus, the control apparatus may control the exhaust gas temperature to the threshold value or less, without lowering the turbine inlet temperature.

Figure 4:
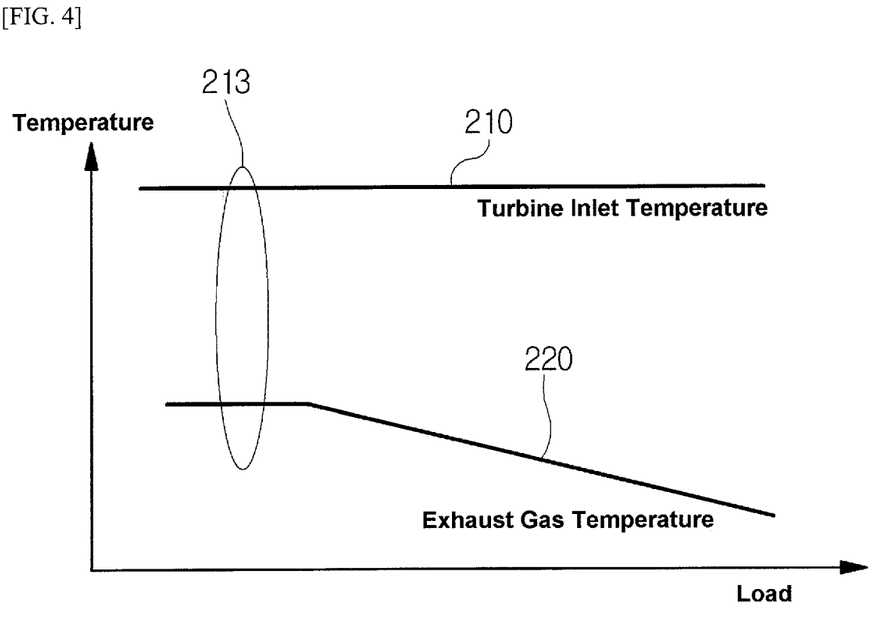
FIG. 4 is a graph illustrating a control result by the control apparatus according to the embodiment of the present invention.

FIG. 4 illustrates a control result by the control apparatus according to the embodiment of the present invention.

Compared to FIG. 2, FIG. 4 shows that the turbine inlet temperature 210 can be maintained at the maximum value in a low load region 213, even though the exhaust gas temperature 220 reaches the threshold value. Therefore, the fuel can be completely combusted while the discharge of harmful exhaust gas is minimized.

Figure 5:
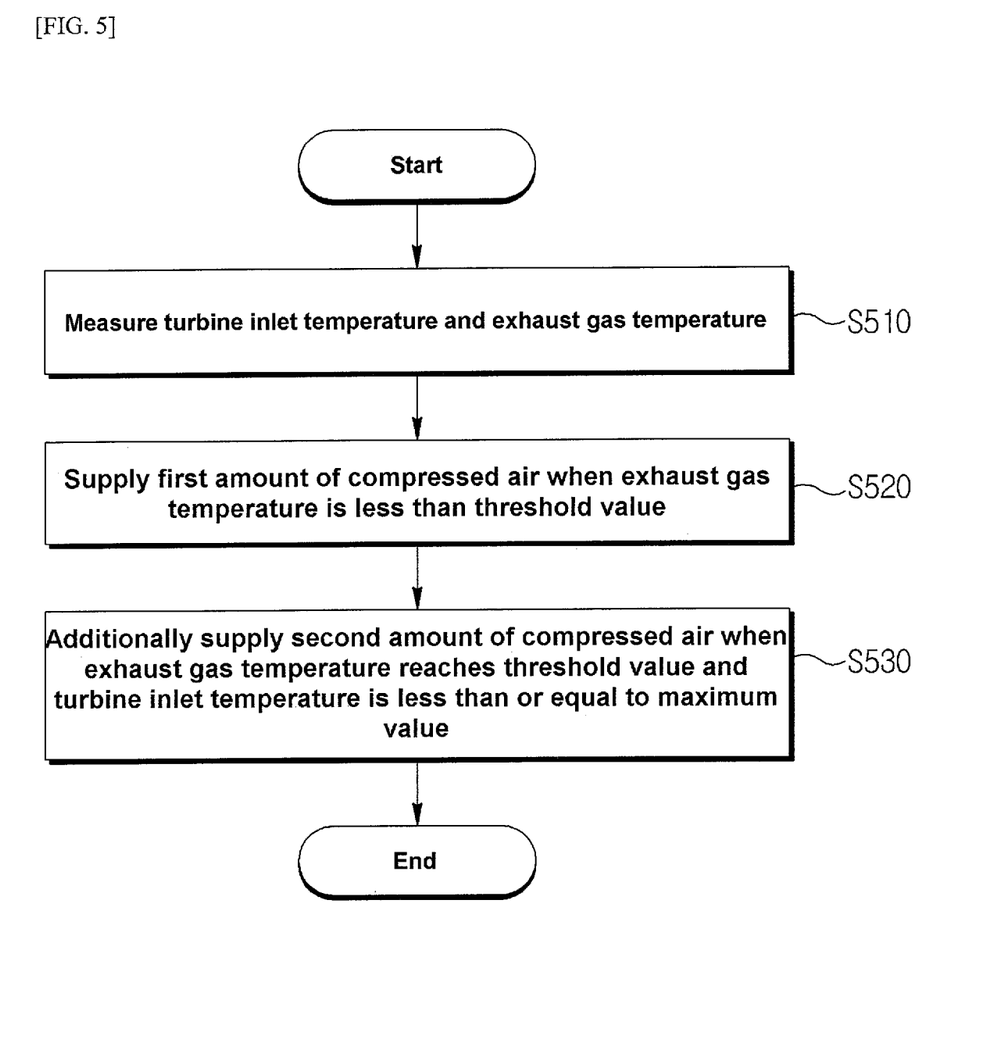
FIG. 5 is a flow diagram illustrating a control method of a gas turbine system according to the embodiment of the present invention.

FIG. 5 illustrates a control method of the control apparatus 100 of the gas turbine system according to one embodiment of the present invention.

Referring to FIGS. 1 to 3 and 5, the control apparatus 100 of the gas turbine system according to the present invention may measure a turbine inlet temperature and an exhaust gas temperature using the sensing unit 110 at step S510. During a normal operation, the turbine inlet temperature may be close to the maximum value, and the exhaust gas temperature may be less than the threshold value. When the exhaust gas temperature is less than the threshold value, the control apparatus 100 may control the air supplying means 50 to continuously supply a first amount of compressed air to the turbine 20 at step S520. However, when a required load decreases, the RPM value of the rotor in the turbine 20 is lowered, and the exhaust gas temperature rises. Then, when the exhaust gas temperature reaches the threshold value and the turbine inlet temperature is less than or equal to the maximum value, the control apparatus 100 may increase the supply of the compressed air to a second amount of compressed air at step S530. At this time, the second amount of compressed air may be set based on the measured turbine inlet temperature. In an embodiment, the second amount of compressed air may be set according to a ratio calculated as (maximum value of turbine inlet temperature−current turbine inlet temperature)/(maximum value of turbine inlet temperature).

The above-described configuration is based on the supposition that the turbine inlet temperature can be measured. However, when the turbine inlet temperature is extremely high, the turbine inlet temperature may be unmeasurable. In this case, the control apparatus 100 may estimate the turbine inlet temperature based on the exhaust gas temperature and the load.

That is, when the exhaust gas temperature is the threshold value and the load is low (partial load state 211), the control apparatus 100 may determine, or assume, that the turbine inlet temperature is less than or equal to the maximum value. At this time, the control apparatus 100 may set an additional amount of compressed air supplied to the turbine, based on the load or the RPM value of the rotor in the turbine 20. In an embodiment, the control apparatus 100 may set the additional amount of compressed air supplied to the turbine in proportion to a value calculated as (load of point A−current load)/(load of point A). Here, the current load may be assumed as the load of a current point B, and the load of a point A is the load at which the turbine inlet temperature corresponds to the maximum value in a normal state and the inflection point where the exhaust gas temperature drops from the threshold value.

Figure 6:
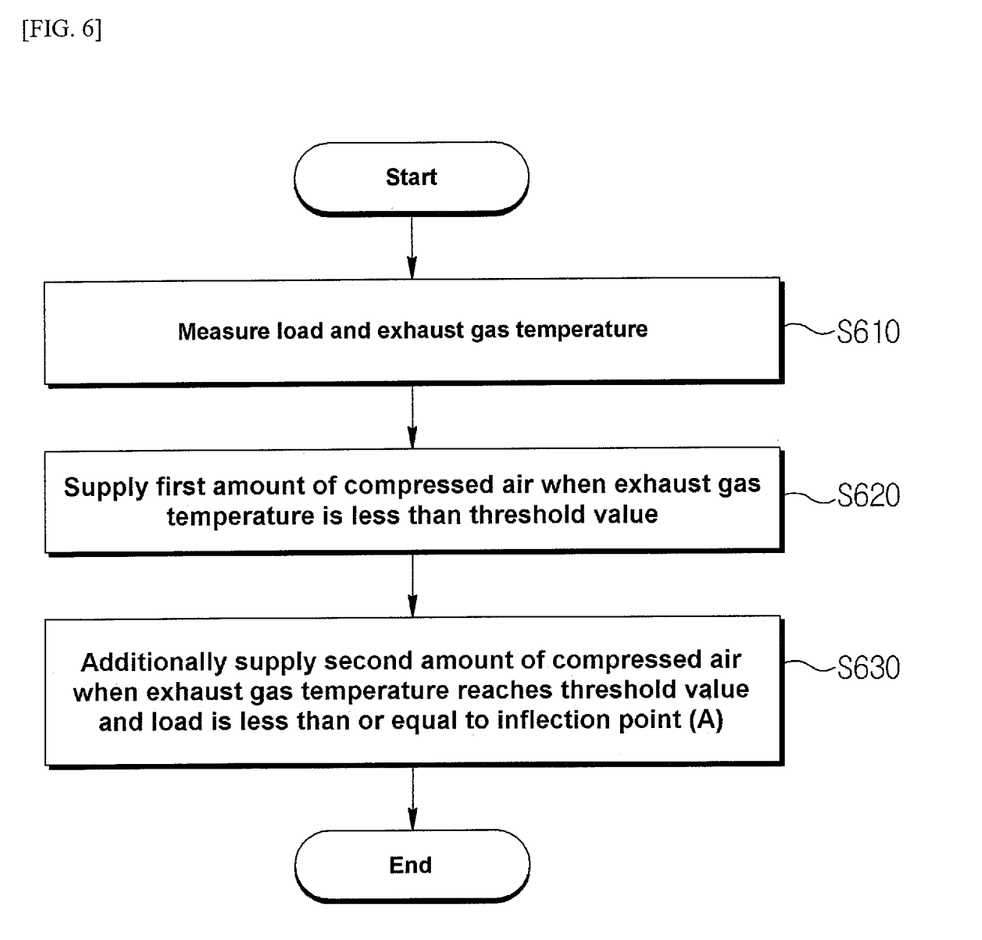
FIG. 6 is a flow diagram illustrating a control method of a gas turbine system according to another embodiment of the present invention.

FIG. 6 illustrates a control method of the control apparatus 100 of the gas turbine system according to another embodiment of the present invention. The embodiment of FIG. 6 may be implemented when the turbine inlet temperature of combustion gas cannot be measured or when the temperature value is otherwise unavailable.

Referring to FIGS. 1 to 3 and 6, the control apparatus 100 of the gas turbine system according to the present invention may measure a load and an exhaust gas temperature using the sensing unit 110 at step S610. During a normal operation, the turbine inlet temperature may be close to the maximum value, and the exhaust gas temperature may be less than the threshold value. When the exhaust gas temperature is less than the threshold value, the control apparatus 100 may control the air supplying means 50 to continuously supply a first amount of compressed air to the turbine 20 at step S620. However, when a required load decreases, the RPM value of the rotor in the turbine 20 is lowered, and the exhaust gas temperature rises. Then, when the exhaust gas temperature reaches the threshold value and the load is smaller than the load at the inflection point A when the exhaust gas temperature starts to drop (that is, to change from the preset threshold value to a value lower than the preset threshold value), the control apparatus 100 can increase the supply of the compressed air to a third amount of compressed air at step S630. At this time, the third amount of compressed air may be set based on the measured load. In an embodiment, the third amount of compressed air may be set in proportion to a ratio calculated as (load of point A−current load)/(load of point A). Alternatively, since the load and the RPM of the rotor in the turbine provide the same physical concept, the control apparatus 100 may set the third amount of compressed air in proportion to a ratio calculated as (RPM of point A−current RPM)/(RPM of point A). Verbally, the ratio may be expressed as the difference between the load (or RPN value) of point A and the current load (or RPM value) over the load (or RPN value) of point A.

As described above, the present invention discloses the control apparatus which controls the turbine inlet temperature to have the maximum value, the turbine inlet temperature indicating the temperature of combustion gas introduced into the turbine. The use of the control apparatus can minimize the amount of harmful exhaust gas discharged from the gas turbine system.

According to the embodiments of the present invention, the control apparatus and method can allow the combustor to completely combust fuel even in a low load state, thereby reducing the amount of harmful exhaust gas.

Furthermore, according to the embodiments of the present invention, the control apparatus and method can adjust the amount of compressed air for cooling, which is supplied to the turbine, thereby lowering the temperature of the exhaust gas discharged from the turbine.

While the present invention has been described with respect to the specific embodiments, it will be apparent to those skilled in the art that various changes and modifications may be made without departing from the spirit and scope of the invention as defined in the following claims.

What is claimed is:

1. A control apparatus of a gas turbine system which includes a compressor for sucking and compressing air and which drives a power generator through rotation of a turbine, the compressor supplying compressed air to a combustor and the turbine, the control apparatus comprising:
   a first sensor configured to measure a turbine inlet temperature indicating a temperature of combustion gas introduced into the turbine
   a second sensor configured to measure an exhaust gas temperature indicating a temperature of exhaust gas discharged from the turbine; and
   a compressed air controller configured to adjust an amount of the compressed air supplied to the turbine, based on the measured turbine inlet temperature and the measured exhaust gas temperature, the compressed air controller further configured to
      supply a first amount of compressed air when the exhaust gas temperature is less than a preset threshold value,
      additionally supply a second amount of compressed air when the exhaust gas temperature reaches the preset threshold value and the turbine inlet temperature is less than or equal to a preset maximum value, and
      set the second amount in proportion to {(the first amount)×(the preset maximum value of the turbine inlet temperature−the measured turbine inlet temperature)/(the preset maximum value of the turbine inlet temperature}.

2. The control apparatus of claim 1, wherein the compressed air controller is further configured to increase the adjusted amount of compressed air supplied to the turbine when the exhaust gas temperature rises.

3. A control method of a gas turbine system which includes a compressor for sucking and compressing air and a turbine and which drives a power generator through rotation of a turbine, the compressor supplying compressed air to a combustor and the turbine, the control method comprising:
   measuring a turbine inlet temperature indicating a temperature of combustion gas introduced into the turbine;
   measuring an exhaust gas temperature indicating a temperature of exhaust gas discharged from the turbine; and
   adjusting an amount of the compressed air supplied to the turbine, based on the measured turbine inlet temperature and the measured exhaust gas temperature, the adjusting comprising:
      supplying a first amount of compressed air when the exhaust gas temperature is less than a preset threshold value,
      additionally supplying a second amount of compressed air when the exhaust gas temperature reaches the preset threshold value and the turbine inlet temperature is less than or equal to a preset maximum value, and
      setting the second amount in proportion to {(the first amount)×(the preset maximum value of the turbine inlet temperature−the measured turbine inlet temperature)/(the preset maximum value of the turbine inlet temperature)}.

4. The control method of claim 3, wherein the adjusting further comprises:
   increasing the adjusted amount of compressed air supplied to the turbine when the exhaust gas temperature rises.

* * * * *